Fig. 6 (III)

INVENTOR
TOSHIHIKO SATAKE

Fig. 11

United States Patent Office 3,426,442
Patented Feb. 11, 1969

3,426,442
DRYING APPARATUS FOR CEREALS
Toshihiko Satake, 2–38 Oaza Nishihon-machi, Saijo-cho, Kamo-gun, Hiroshima Prefecture, Japan
Filed June 1, 1967, Ser. No. 642,898
Claims priority, application Japan, June 10, 1966, 41/37,411; Aug. 15, 1966 (utility model), 41/76,846; Oct. 22, 1966, 41/69,866; Oct. 22, 1966 (utility model), 41/98,204; Oct. 22, 1966 (utility model), 41/98,203; Nov. 17, 1966 (utility model), 41/106,338; Dec. 14, 1966 (utility model), 41/114,324
U.S. Cl. 34—102    7 Claims
Int. Cl. F26b 17/14, 25/00

ABSTRACT OF THE DISCLOSURE

A drying apparatus for cereals is comprised of a hot-air drying chamber in which the cereals are subjected to a flow of high temperature air for a comparatively short time and brans thereof are dried, a tempering chamber is in communication with the drying chamber in which the cereals are stored for a comparatively long time, and the moisture in the starchness, or endosperm and germ of the cereals is tempered and transferred over to the dried brans, and a conveyance extends between the drying chamber and tempering chamber for circulating the cereals from the drying chamber to the tempering chamber. In the drying apparatus the cereals are constantly and uniform circulated at a predetermined speed and dried efficiently by successive and repeating drying and tempering operations in the drying chamber and tempering chamber.

Summary of the invention

This invention relates to a drying apparatus for cereals and, more particularly, it is concerned with apparatus for alternately and uniformly drying cereal as the cereal is sequentially circulated between a tempering chamber and and a drying chamber.

An object of the present invention is to provide a drying apparatus for cereals capable of drying the cereals uniformly.

Another object of the present invention is to provide a drying apparatus for cereals wherein the intervals of time during which the cereals are passed through one or more hot-air drying chambers are adjustable as desired.

A further object of the present invention is to provide a drying apparatus for cereals so made that the cereals may descend into two or more hot-air drying chambers from a tempering chamber so as to shorten the time needed in completion of drying the cereals.

A further object of the present invention is to provide a drying apparatus for cereals wherein the cereals are enabled to descend into each of two or more hot-air drying chambers in an equal amount.

A further object of the present invention is to provide a drying apparatus for cereals wherein provision is made for preventing the flying of dust and dirt that is liable to take place during a drying operation and hence the environment is maintained in the hygienic state.

A further object of the present invention is to provide a drying apparatus for cereals so made that the cereals supplied from a conveyance into a tempering chamber may be distributed at an even height without being heaped partially towards the center of the tempering chamber.

A still further object is to provide a drying apparatus for cereals so made that the foreign substances such as small stalks that may be mixed wtih cereals may be distributed as uniformly as possible inside a tempering chamber so as to enable the succeding steps of drying to be performed smoothly.

With these objects in view and the other objects hereinafter set forth, the present invention will now be described in detail with reference to the accompanying drawings showing certain embodiments thereof.

Figure 1:
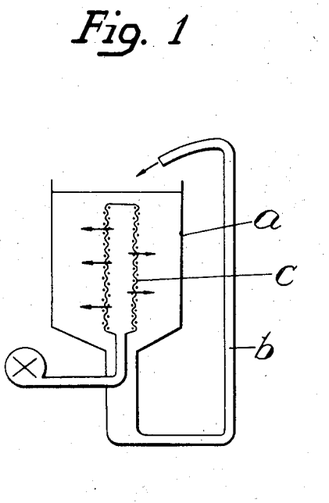
FIG. 1 is an explanatory view of a conventional hot-air drier for cereals.

In FIG. 1, a conventional hot-air drier for cereals is shown, in which the cereals are fed into the drier $a$ from a lift $b$ sequentially and cyclically and dried by hot air blown from a column of wire gauze $c$ provided in the chamber of the drier, while they are stored inside the drier. In this type of the drying system, it usually takes half an hour to several hours for drying the whole cereals in the drier, because a hot air blast of high temperature air can not be used. Furthermore, such drying system has such a deficiency that the cereals remote from the wire gauze $c$ can not be dried satisfactorily as compared with those close to the wire gauze $c$, resulting in uneven drying.

Figure 2:
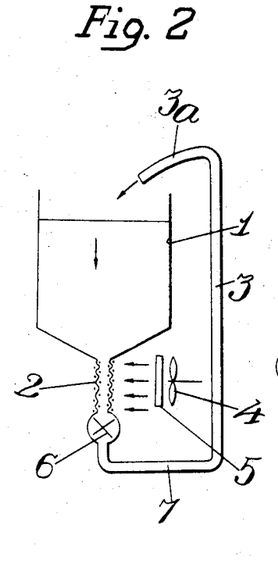
FIG. 2 is an explanatory view showing a basic structure of the drying apparatus according to the present invention.

This invention has been made with a view to eliminating the above drawbacks, the drying system of the invention is illustrated diagrammatically in FIG. 2. In this figure, 1 indicates a tempering chamber, 2 a hot-air drying chamber, 3 a conveyance, 4 a blower, 5 a heating element, and 6 rotary vanes. The drying chamber 2 is made from wire gauze to permit ventilation, and the capacity of the tempering chamber is made considerably larger than that of the drying chamber, as for instance sixteen times as large as that of the drying chamber as described in detail hereinafter. This drying chamber 2 is connected at its upper opening to the bottom part of the tempering chamber 1 and at its lower opening to the conveyance 3 via the rotary vanes 6 and connection pipe 7, the conveyance 3 being of the type employing a number of bucket's mounted on a moving endless belt.

In the above-mentioned construction, the cereals supplied into the tempering chamber 1 via a supply pipe 3$a$ of the conveyance 3 are supplied by gravity into the drying chamber 2 sequentially to be exposed to a hot blast of high temperature air from the outside, and are circulated to the tempering chamber 1 by means of the conveyance 3 via rotary vanes 6 and connection pipe 7. It is possible for the cereals to withstand an air blast of high temperature without baking or burning if for a short period of time, and a hot blast for such a short period of time is good enough to remove moisture from the brans of the cereals. If the cereals which have the moisture removed from their brans are left for a certain period of time, the moisture in their starch layers is transferred to the brans and cyclic repeat of such drying and tempering operations results in uniformly drying the cereals.

Explaining in further details, the intervals of time that the cereals are passed through the inside of the drying chamber 2 are adjustable by adjusting the speed of the rotary vanes. For instance, if the cereals are arranged to pass through the drying chamber in five minutes, then the cereals are exposed to the high-temperature hot blast for five minutes. Provided that the capacity of the drying chamber 2 bears a ratio of 1:16 to that of the tempering chamber 1, the cereals are to be stored inside the tempering chamber 1 for 5 minutes times 16, or 80 minutes. During this period of time, the cereal is tempered, to wit, the moisture inside the starch layer of the grain is transferred towards the bran.

A still better effect of dehydration may be obtained if the drying chamber 2 is formed helically.

Figure 3:
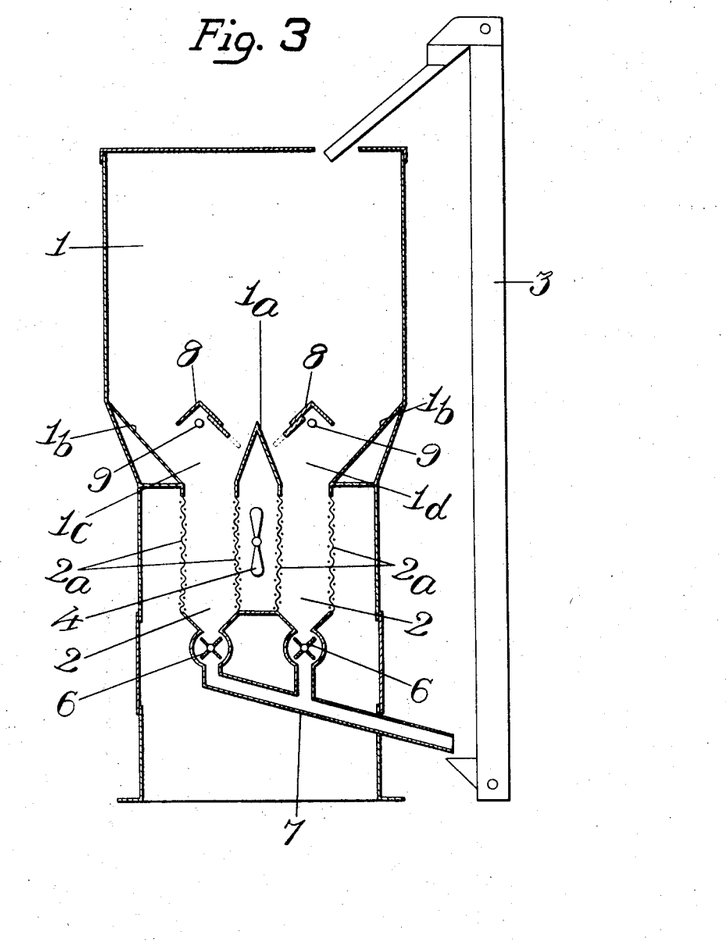
FIG. 3 is a cross-sectional side elevational view showing the drying apparatus of the present invention provided with a pair of hot air drying chambers and equipped with a feed control device.

Referring to FIG. 3, 1 indicates similarly to FIG. 2, a tempering chamber, 2, 2 indicate drying chambers, 3 indicates a conveyance, 4 indicates a blower, 6, 6 indicate rotary vanes, and 7 indicates a connection pipe. Centrally and on either side of the tempering chamber 1 are provided guide plates 1a and 1b to define two passageways 1c, 1d and drying chambers 2, 2 are connected to the lower parts of the passageways 1c, 1d. Both drying chambers 2, 2 are made of wire gauze 2a, and a blower 4 is placed between the two drying chambers 2, 2, whereby a hot blast is adapted to be directed through the drying chambers 2, 2.

Figure 4:
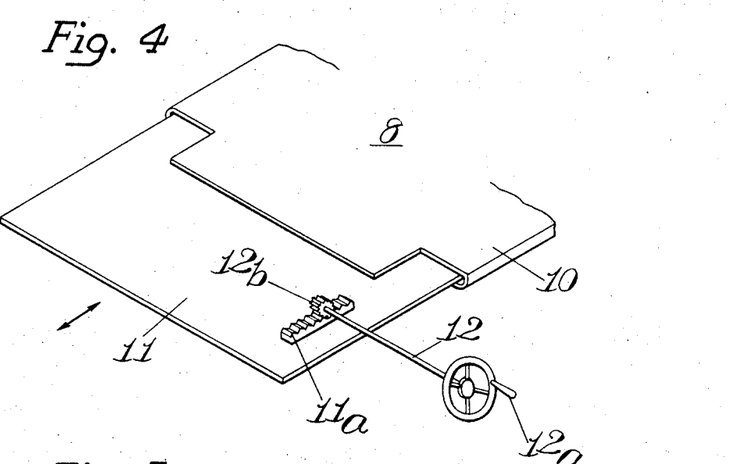
FIGS. 4 and 5 are enlarged perspective views showing two embodiments of a feed control plate of the above-mentioned feed control device.
Figure 5:
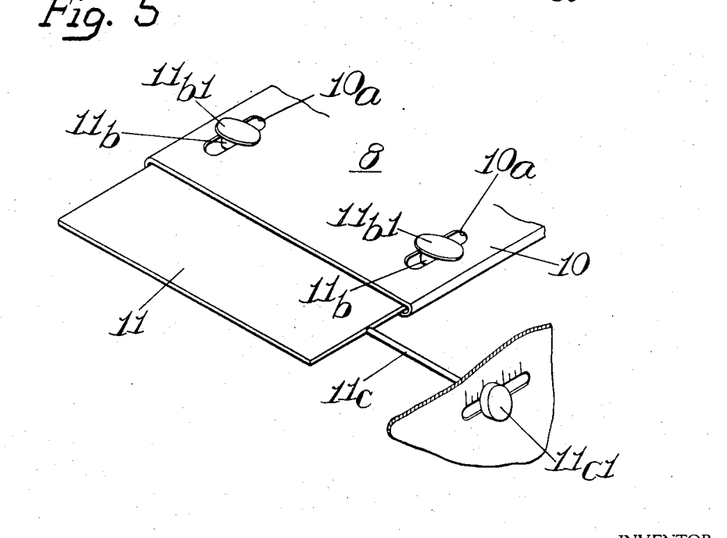

Reference numerals 8, 8 indicate a feed control device mounted centrally at the entrance to the aforesaid passageways 1c, 1d, and an exhaust port 9 is provided below the feed control device for discharging air. This device 8, as shown in FIGS. 4 and 5, consists of a principal control plate 10 of an angular shape and a subsidiary control plate 11 of a flat plate shape fitted adjacent and movably relative to the principal control plate 10. FIGS. 4 and 5 show drive means for moving the subsidiary control plate 11 relative to the principal control plate 10. In FIG. 4, a rack 11a secured to the subsidiary plate 11 engages with a pinion 12b secured to the shaft 12 of a handle 12a and the plate 11 is movable in the direction of the arrow by turning the handle 12a. In FIG. 5, an operating lever 11c having a knob $11c_1$ is secured to the subsidiary control plate 11 fitted a projection 11b having a head $11b_1$ and inserted into a guide groove 10a provided to the principal control plate 10, and the subsidiary control plate 11 is movable, to and from by moving the knob $11c_1$ in a lateral direction within its slot. As the case may be, the subsidiary control plate 11 may be omitted and a triangular principal control plate may be mounted tiltably in the horizontal plane and in the vertical plane.

Figure 6:
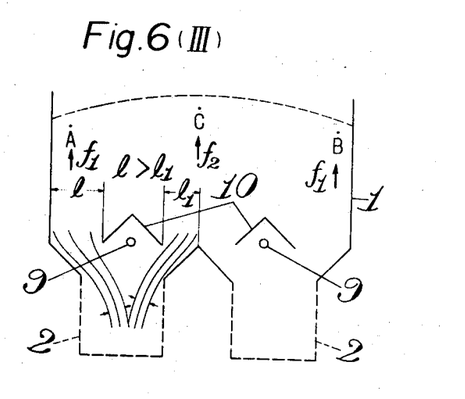
Figure 6I:
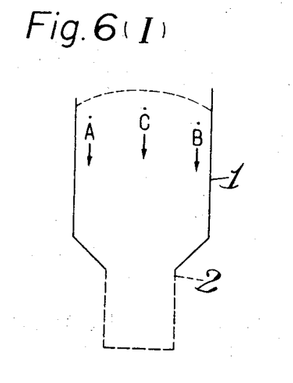
FIGS. 6(I), (II), (III) and (IV) are the explanatory views showing the flow of cereals from a tempering chamber into a drying chamber.

In this kind of drying apparatus for cereals, a prerequisite from the point of view of uniform drying is to feed the cereals inside the tempering chamber 1 uniformly downwardly and to let the same into the drying chamber 2 in trim order. If the uniform feed of the cereals cannot be accomplished, uneven dryness will result due to the fact that certain portions of the cereals are passed through the drying chamber 2 but others are not, or in other words, due to the difference in the numbers of times that some given portions of the cereals have been passed through the drying chamber 2 during several cycles of the drying and tempering operations. Certain phenomena that obstruct uniform feed of cereals will now be explained with reference to FIG. 6. FIG 6(I) shows the simplest system with a single drying chamber 2 provided beneath the tempering chamber 1. When the tempering chamber 1 is filled to capacity with cereals and the cereals are fed into the drying chamber 2 beneath the tempering chamber, the cereals contained in the tempering chamber 1 at the points A and B and at the central point C are fed in approximately equal amounts and no problems are encountered. Cereals at the central point C are likely to be fed faster than at the points A and B due to the smaller frictional resistance, but the difference thus caused is almost negligible.

Another difficulty met with in this kind of drying apparatus is that part of the hot blast passing through the drying chamber in the lateral direction is apt to be introduced into the tempering chamber and thus gives rise to uneven dryness. In this embodiment, as shown in FIG. 6(II), an angular principal control plate 10 of the feed control device 8 serves to prevent, along with exhaust port 9, the introduction of the hot blast into the tempering chamber 1. Theoretically, if the principal control plate 10 is located exactly centrally of the drying chamber 2, that is, if plate 10 is placed in the drying chamber 2 so that the distance $l$ equals the distance $l_1$ as shown in the drawing, then the cereals are to be divided into two streams each containing an equal amount of cereals. However, as a matter of fact, some difference is caused due to the various causes. To cite an instance, many foreign substances contained in the cereals supplied from the conveyance 3 fixedly mounted on one side of the tempering chamber 1 are very likely to be slid on the uppermost layer of the cereals and heaped partially to one side of the apparatus. Such tendency varies appreciably even with the apparatus of the same kind manufactured under the same design. In some apparatus, the foreign substances are heaped partially towards the right, while in some other apparatus they are heaped partially towards the left, and such tendency is all the more apparent if the errors introduced in the machining process are taken into account.

Furthermore, in the case of a tempering chamber of larger capacity, floor space is increased due to the limitation of the height, and increase in floor space necessitates the division of the drying chambers 2 into two chamber as in the embodiment described with reference to FIG. 3. If the drying chamber 2 is thus divided into two chambers, the friction $f_2$ at the center is lessened appreciably compared with the friction $f_1$ at either side of the chamber 1. If, under these circumstances, the principal control plate 10 is so placed that the distance $l$ equals to the distance $l_1$, the amount of cereals fed from $l_1$, is far larger than that fed from $l$. Even if such circumstances are taken into account and the control plate 10 is so placed that the distance $l$ is greater than the distance $l_1$, satisfactory result that may be attained will be temporary, because as the cereals are more and more dried through several cycles of the drying and tempering operations the friction $f_1$ at A and the friction $f_2$ at C become nearly equal to each other, and the amount of cereals fed from $l$ will increase by leaps and the feed of cereals from $l_1$ may sometimes be retarded completely.

In recent years, threshing on the spot, or threshing partly dried cereals immediately after reaping, has come to be popular to save the labor of hanging reaped plants on racks. In such cases, spikes and heads of the plants are hardly separable from cereals and such spikes and heads filled inside the tempering chamber with cereals prevent the smooth feed of cereals. In the embodiment shown in FIGS. 3, 4 and 5, the ratio of $l$ to $l_1$ may be varied as desired, and smooth feed of cereals may be attained satisfactorily even if small stalks or other foreign substances are stuck to or admixed with cereals supplied to the tempering chamber 1.

Figure 7:
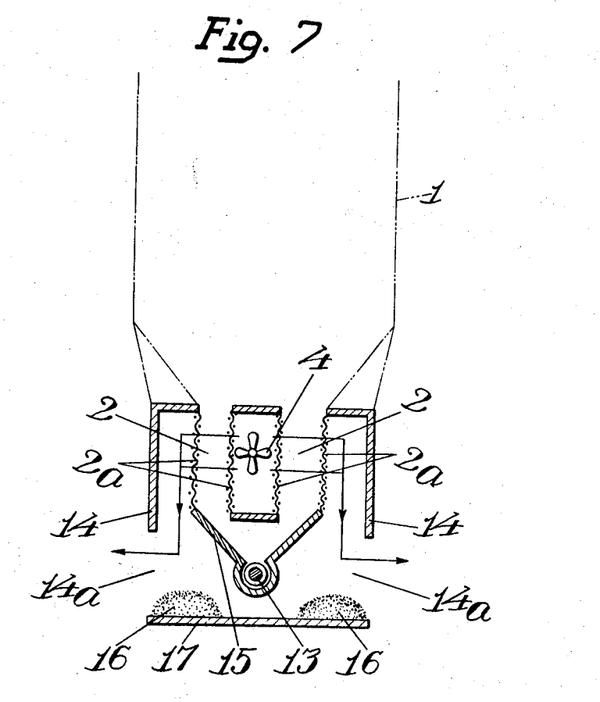
FIG. 7 is a cross-sectional side elevational view of a dust collector provided to the present apparatus.

FIG. 7 shows an example of a dust collector wherein similarly to the aforementioned examples, 1 indicates a tempering chamber, 2, 2 indicate drying chambers constituted from wire gauze 2a or the like, 4 indicates a blower, and 13 indicates a screw conveyor. On either side of the drying chambers 2, 2 are provided deflectors 14 having openings 14a at their lower ends, while on top of screw conveyor 13 are provided guide plates 15. In this construction, a hot blast from blower 4 moving across the inside of the drying chambers 2, 2 is directed against the inner sides of the deflectors 14, and is discharged to the outside via openings 14a after being deflected in a downward direction by the inner sides of the deflectors 14. At this time, foreign matter 16 such as dust and dirt are piled up on the bottom plate 17, while the cereals are delivered to the conveyance 3 through the screw conveyor 13. Foreign substances 16 piled up on the bottom plate 17 are scraped away via the openings 14a in an appropriate manner. Base plates may also be provided to the openings.

By providing such a dust collector, dust is not raised and the environment may be maintained in a most hygienic state. Moreover, deflectors 14 play a part as reinforcements or supports for and the tempering chamber whereby the stability of tempering chambers of larger capacity can be sustained in stability.

Figure 8:
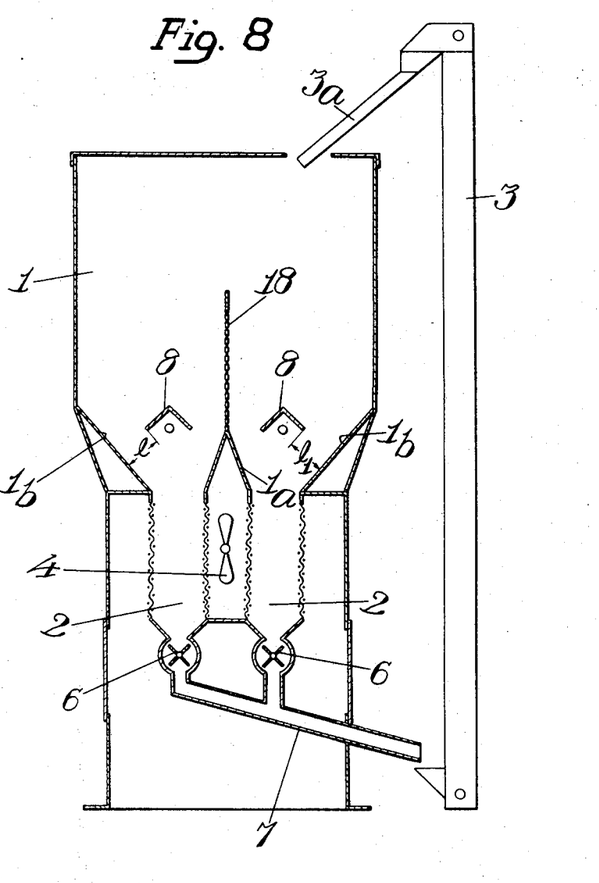
FIG. 8 is a cross-sectional side elevational view showing another embodiment of the feed control device.

FIG. 8 shows a further embodiment of the feed control device wherein 1 indicates a tempering chamber, 2, 2 indate drying chambers, 3 indicates a conveyance, 4 indicates a blower, 6, 6 indicate rotary vanes, 7 indicates a connection pipe, 8, 8 indicate feed control devices, and 1a, 1b indicate guide plates. These components are the same as those explained with reference to FIG. 3. In this embodiment, a friction plate 18 is provided above guide plate 1a. If this friction member 18 is not provided, the cereals supplied to the inside of the tempering chamber 1 from the supply pipe 3a of the conveyance 3 are apt to be heaped partially near the central part of the tempering chamber 1 forming a conical heap of the cereals with the apex of the cone located directly below the supply pipe 3a. In such an instance, small stalks mixed with rough grain are slid along the slope formed by the uppermost layer of the heaped grain and are heaped partially near the periphery of the tempering chamber 1, with the result that the feed of the cereals along the periphery of the tempering chamber 1 is retarded as compared with that near the central portion of the chamber 1. Consequently, disparity arises in the feed of cereals through $l$, $l_1$. It should be noted that feed of cereals is unlike the flow of water and sometimes the feed of cereals is smooth in one place and completely retarded in the other. Consequently, undried grain are mixed with well dried grain. By providing a friction plate 18, friction at this portion is made identical with that at the periphery and the cereals may be fed through $l$, $l_1$ in equal amounts.

Figure 9:
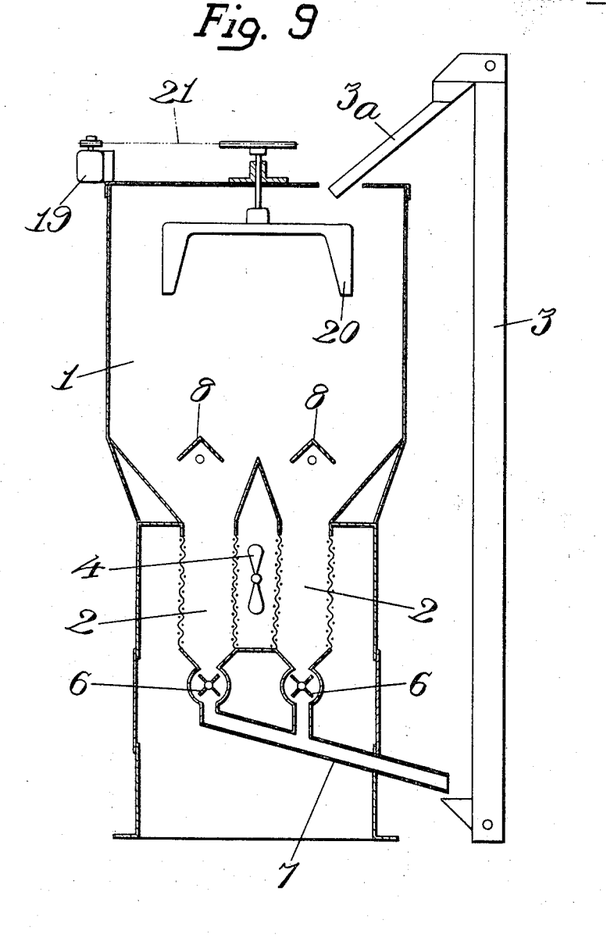
FIG. 9 is a cross-sectional side elevational view of a feed equalizing device.
Figure 10:
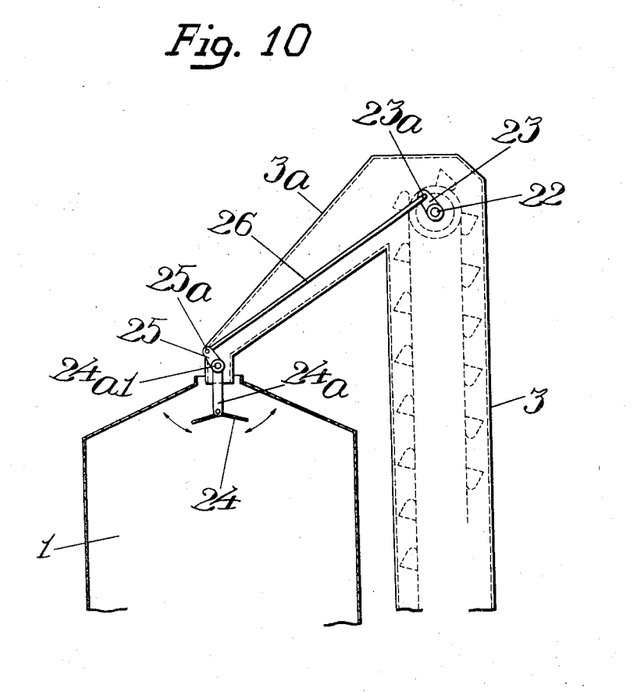
FIG. 10 is a cross-sectional side elevational view showing another embodiment of the feed equalizing device.
Figure 11:
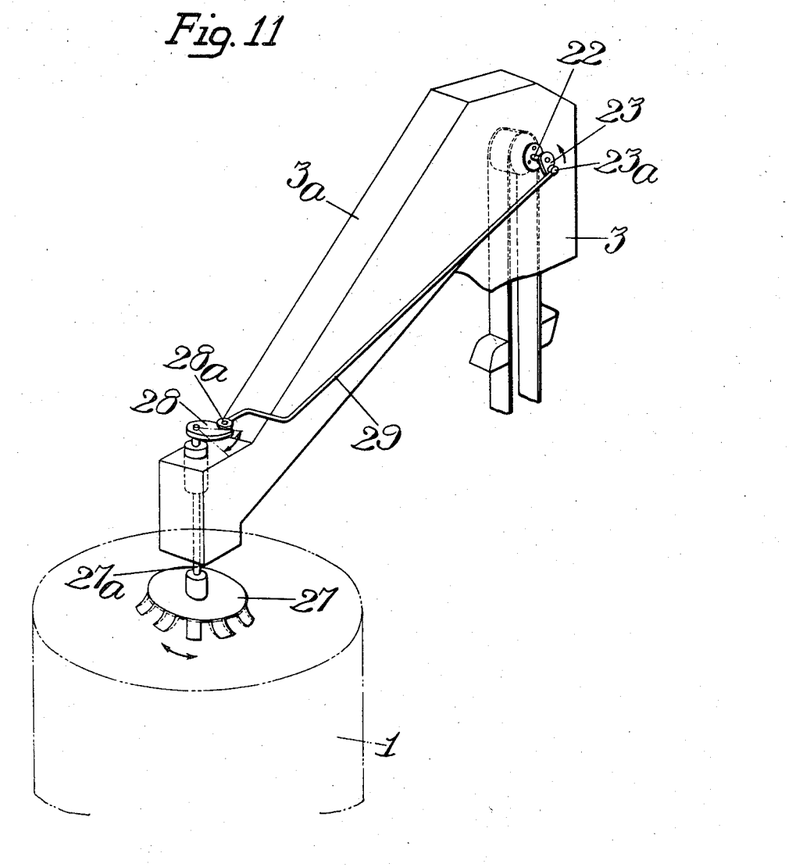
FIG. 11 is a perspective view showing still another embodiment of the feed equalizing device.

FIGS. 9 to 11 show feed equalizing devices wherein 1 indicates a tempering chamber, 2, 2 indicate drying chambers, 3 indicates a conveyance having a supply pipe 3a, 4 indicates a blower, 6, 6 indicates rotary vanes, 7 indicates a connection pipe, and 8, 8 indicates feed control devices. These components are the same as those explained with reference to FIG. 3.

In FIG. 9, 19 indicates a motor, and 20 indicates a stirring plate arranged to be revolved by means of the motor via reduction gearing 21.

In FIG. 10, 22 indicates a rotary axis of the conveyance 3, 23 a rotary plate secured to the rotary axis 22, 24 an equalizing plate secured to the operating bar 24a, 25 a reciprocating plate, and 26 a connection rod. Connection rod 26 is pivoted at one end to the rotary plate 23 by means of pivot 23a and at the other end to the reciprocating plate 25 by means of pivot 25a. Operating bar 24a is pivoted, along with the reciprocating plate 25, to the foremost part of the supply pipe 3a, the arrangement being such that the equalizing plate 24 is located centrally of the upper inside of the tempering chamber 1.

In FIG. 11, 22 indicates a rotary axis of conveyance 3, 23 a rotary plate secured to the rotary axis 22, 27 a reciprocable stirring plate secured to a vertical axis 27a, 28 a reciprocable plate secured to the vertical axis 27a, and a bent rod 29. Said bent rod 29 is pivoted at one end to the rotary plate 23 by means of a pivot 23a and at the other end to the reciprocable plate 28 by means of a pivot 28a, and the reciprocable stirring plate 27 is located centrally of the upper inside of the tempering chamber 1.

In these embodiments of the invention wherein provision is made of stirring plate 20, equalizing plate 24 or reciprocable stirring plate 27, the cereals supplied to the inside of the tempering chamber 1 via the supply pipe 3a of conveyance 3 are stirred and are not heaped partially in the vicinity of the center of chamber 1. Consequently, the ensuing feed of cereals may be performed uniformly, resulting in the uniform dryness of the cereals.

Although the description of the invention has been made with reference to certain embodiments thereof, it is to be noted that the present invention is not limited to these embodiments but includes other structures coming within the spirit of the invention.

What is claimed is:

1. A drying apparatus for cereals comprising an upright tempering chamber for the storage and tempering of cereals therein, at least one drying chamber disposed below said tempering chamber and having a first end and a second end, said drying chamber being opened at its first end into the bottom of said tempering chamber and having a wall member made of a permeable material forming at least a portion of the enclosing periphery of said drying chamber, said wall member being arranged to permit the passage of a drying gas through said wall member into said drying chamber, blower means placed exteriorily adjacent said drying chamber and being adapted to direct a hot blast of drying gas through said wall member into said drying chamber, a transfer pipe communicating at one end with the second end of said drying chamber and opening at the other end into the upper part of said tempering chamber, a conveying means accommodated within said transfer pipe for conveying material from said drying chamber into said tempering chamber, said drying chamber being arranged to receive a supply of cereal passing downwardly by gravity from said tempering chamber and to recirculate the cereal through said transfer pipe by means of said conveying means to said tempering chamber after it has completed its passage through said drying chamber, the cereal substantially filling said tempering chamber and said drying chamber, and said drying chamber being substantially smaller in volume than said tempering chamber, whereby the period of time the cereal remains in said tempering chamber is a multiple of the period of time the cereal remains in said drying chamber and the period of time the cereal remains in said drying chamber being a predetermined period sufficient for drying the bran of the cereal whereby the moisture from the starch layers is transferred to the bran during the period of time the recirculated cereal remains in said tempering chamber.

2. A drying apparatus for cereals as claimed in claim 1, including at least one plate placed at the opening from said tempering chamber into said drying chambers, said plate being adjustable so as to control the feed of cereals accumulated inside said tempering chamber and falling by gravity into said drying chamber.

3. A drying apparatus for cereals as claimed in claim 2, including means provided beneath said plate at the opening from said tempering chamber into said drying chamber and having an exhaust port opened toward said drying chamber for directing a gaseous medium therethrough, said means being operative in combination with said plate to prevent the introduction into said tempering chamber of a hot blast of drying gas directed into said drying chamber through said wall member.

4. A drying apparatus for cereals as claimed in claim 1, including a deflector wall member encircling said drying chamber and forming a space therebetween and being arranged to deflect the drying gas to a discharge outlet after its passage through said drying chamber.

5. A drying apparatus for cereals as claimed in claim 1, including an upright friction plate mounted centrally within the tempering chamber, said friction plate being effective to afford a resistance to the cereals passing centrally down through said tempering chamber so as to counter balance the frictional resistance encountered by the cereals adjacent to the peripheral surface of said tempering chamber.

6. A drying apparatus for cereals as claimed in claim 1, wherein the ratio of the volume of the tempering chamber to the volume of the drying chamber is 16 to 1.

7. A drying apparatus as claimed in claim 1, including stirring means provided within the upper part of said tempering chamber, said stirring means being operative to produce stirring action so as to uniformly stir the cereals supplied from said transfer pipe into said tempering chamber.

References Cited

UNITED STATES PATENTS

| | | | |
|---|---|---|---|
| 243,401 | 6/1881 | Randol | 263—30 |
| 625,358 | 5/1899 | Schock | 34—102 XR |
| 1,551,965 | 9/1925 | Muller | 34—174 XR |
| 1,829,741 | 11/1931 | Vries | 34—167 XR |
| 3,000,110 | 9/1961 | Forth et al. | 34—174 XR |
| 2,732,630 | 1/1956 | Markowich | 34—174 |

CARLTON R. CROYLE, *Primary Examiner.*

ALLAN D. HERRMANN, *Assistant Examiner.*

U.S. Cl. X.R.

34—167, 174; 259—4